United States Patent
Dimou et al.

(10) Patent No.: US 11,031,981 B1
(45) Date of Patent: Jun. 8, 2021

(54) SPATIAL DIVERSITY REPORTING FOR EFFECTIVE RELIABLE AND LOW-LATENCY COMMUNICATIONS

(71) Applicant: QUALCOMM Incorporated, San Diego, CA (US)

(72) Inventors: Konstantinos Dimou, San Francisco, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/778,991

(22) Filed: Jan. 31, 2020

(51) Int. Cl.
*H04B 7/02* (2018.01)
*H04B 7/0426* (2017.01)
*H04B 7/0417* (2017.01)
*H04L 25/02* (2006.01)

(52) U.S. Cl.
CPC .......... *H04B 7/043* (2013.01); *H04B 7/0417* (2013.01); *H04L 25/021* (2013.01); *H04L 25/0248* (2013.01)

(58) Field of Classification Search
CPC ... H04B 7/043; H04B 7/0417; H04L 25/0248; H04L 25/021
USPC ......................................................... 375/267
See application file for complete search history.

(56) References Cited

U.S. PATENT DOCUMENTS

| | | | | |
|---|---|---|---|---|
| 2017/0302353 A1* | 10/2017 | Rahman | ............... | H04B 7/0486 |
| 2019/0199412 A1* | 6/2019 | Koskela | ............... | H04B 7/0417 |
| 2019/0312623 A1* | 10/2019 | Park | ................... | H04B 7/0626 |
| 2019/0326959 A1* | 10/2019 | Davydov | ............. | H04L 5/0051 |
| 2019/0349035 A1* | 11/2019 | Yang | .................... | H04B 7/0417 |

* cited by examiner

*Primary Examiner* — Don N Vo
(74) *Attorney, Agent, or Firm* — Quarles & Brady LLP

(57) ABSTRACT

Aspects of the disclosure relate to a multi-antenna wireless user equipment (UE) calculating a covariance matrix corresponding to a covariance of signals received from each of its antennas. The UE further calculates the eigenvectors of the covariance matrix, and transmits feedback including information corresponding to the eigenvectors. Based on this information, a base station can determine to alter a number of beams for transmitting information to the UE, efficiently improving the reliability of transmission to the UE. Other aspects, embodiments, and features are also claimed and described.

18 Claims, 10 Drawing Sheets

Example 1

Example 2

US 11,031,981 B1

SPATIAL DIVERSITY REPORTING FOR EFFECTIVE RELIABLE AND LOW-LATENCY COMMUNICATIONS

TECHNICAL FIELD

The technology discussed below relates generally to wireless communication systems, and more particularly, to spatial diversity reporting for effective ultra-reliable and low-latency communications (URLLC). Embodiments can provide and enable techniques for altering a number of spatial beams.

INTRODUCTION

In millimeter-wave (mmW) cellular communication systems, beamforming is widely used to overcome high path losses. With beamforming, both a base station and a user equipment (UE) find and maintain suitable beams to maintain a communication link Beam management is a procedure these nodes generally utilize to refine the beams being used due to changing channel conditions, e.g., due to movement of the UE or other objects in the path of the link.

With the recent introduction of ultra-reliable and low-latency communication (URLLC), a broad variety of applications with very stringent targets for reliability and latency have become feasible. However, applications with extremely low latency targets mean that conventional beam management procedures may be inadequate.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to a multi-antenna wireless user equipment (UE) calculating a covariance matrix corresponding to a covariance of signals received from each of its antennas. The UE further calculates the eigenvectors of the covariance matrix, and transmits feedback including information corresponding to the eigenvectors. Based on this information, a base station can determine to alter a number of beams for transmitting information to the UE, efficiently improving the reliability of transmission to the UE.

In one example, a method of wireless communication is disclosed. The method includes receiving a packet utilizing a plurality of antennas. The method further includes calculating at least one covariance matrix corresponding to a covariance of signals, from each of the plurality of antennas, corresponding to the received packet. The method further includes calculating one or more eigenvectors of each covariance matrix of the at least one covariance matrix. The method further includes transmitting a response to the received packet, the response comprising information corresponding to the calculated one or more eigenvectors.

In another example, a method of wireless communication operable at a first transmission point (TRP) is disclosed. The method includes transmitting a packet to a multi-antenna receiving device, utilizing a first number of beams. The method further includes receiving a response to the packet, the response including information corresponding to one or more eigenvectors of at least one covariance matrix corresponding to a covariance of signals from each of a plurality of receive antennas at the multi-antenna receiving device, used to receive the packet. The method further includes determining, based on the response, whether to alter a number of beams to a second number of beams, different from the first number of beams.

In another example, first transmission point (TRP) for wireless communication is disclosed. The TRP includes a processor; a transceiver communicatively coupled to the processor, the transceiver including a plurality of antennas; and a memory communicatively coupled to the processor. The processor and the memory are configured to transmit, via the transceiver, a packet to a multi-antenna receiving device, utilizing a first number of beams. The processor and the memory are further configured to receive, via the transceiver, a response to the packet, the response including information corresponding to one or more eigenvectors of at least one covariance matrix corresponding to a covariance of signals from each of a plurality of receive antennas at the multi-antenna receiving device, used to receive the packet. The processor and the memory are further configured to determine, based on the response, whether to alter a number of beams to a second number of beams, different from the first number of beams.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
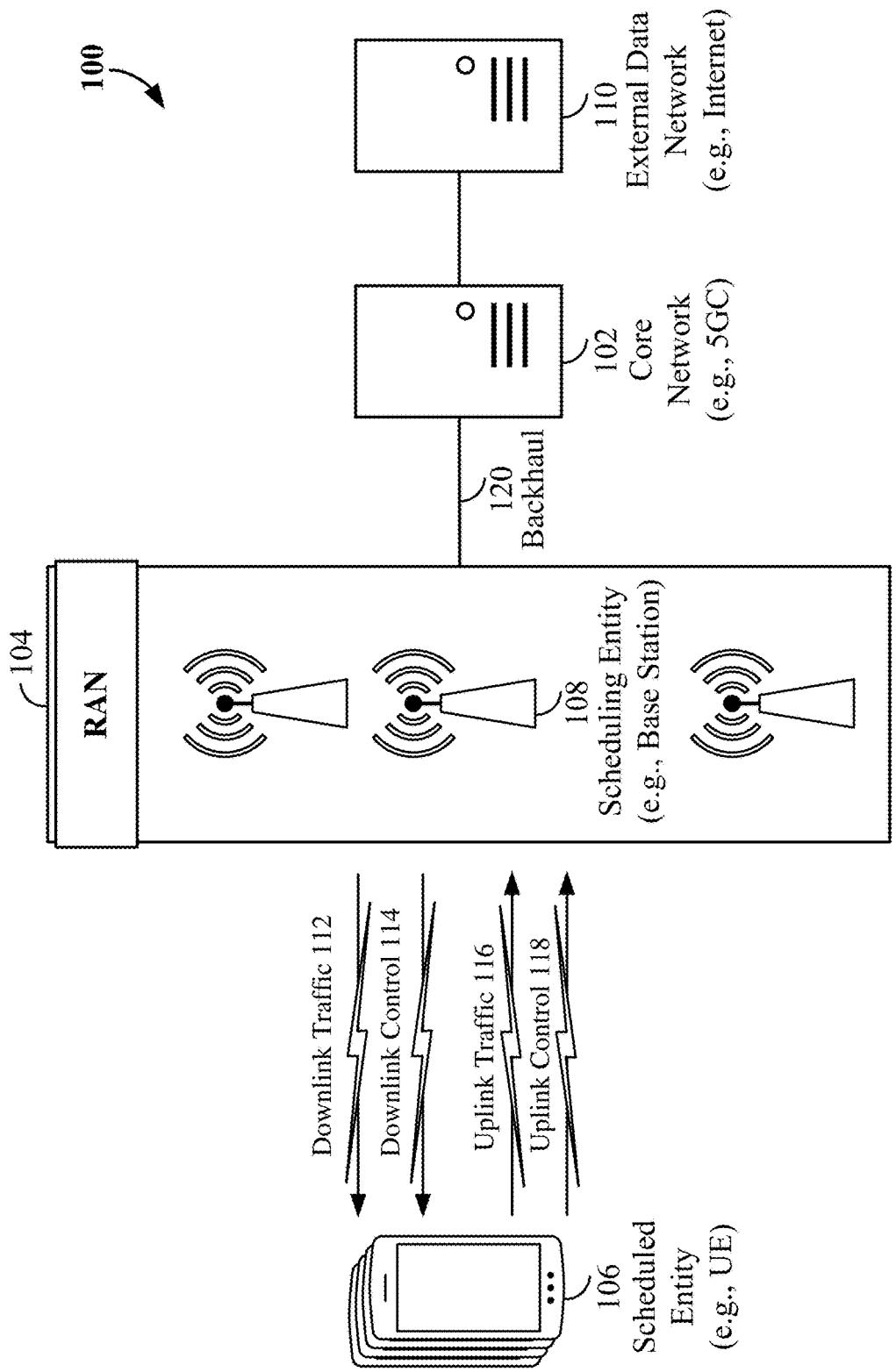
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the disclosure relate to a multi-antenna wireless user equipment (UE) calculating a covariance matrix corresponding to a covariance of signals received from each of its antennas. The UE further calculates the eigenvectors of the covariance matrix, and transmits feedback including information corresponding to the eigenvectors. Based on this information, a base station can determine to alter a number of beams for transmitting information to the UE, efficiently improving the reliability of transmission to the UE. Other aspects, embodiments, and features are also claimed and described.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface 120 for communication with a backhaul portion of the wireless communication system. The backhaul interface 120 may provide a link between a base station 108 and the core network 102. Further, in some examples, a backhaul network may provide interconnection between the respective base stations 108. Various types of backhaul interfaces 120 may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
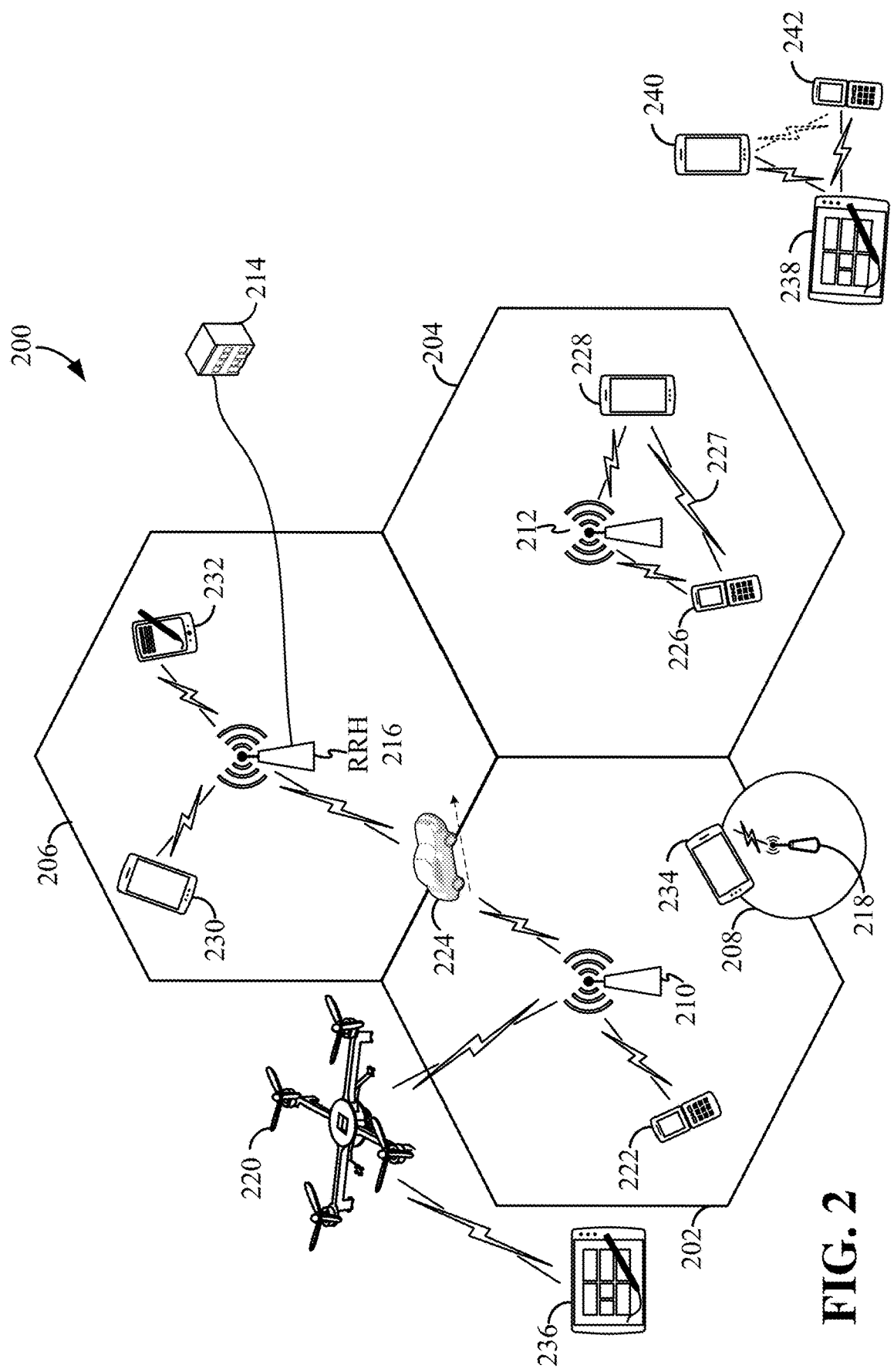
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a UE based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a duration of 10 ms for wireless transmissions, with each frame consisting of, for example, 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. An OFDM air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, intersymbol interference can be eliminated. OFDM channels provide for high data rates by allocating a data stream in a parallel manner across multiple subcarriers. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
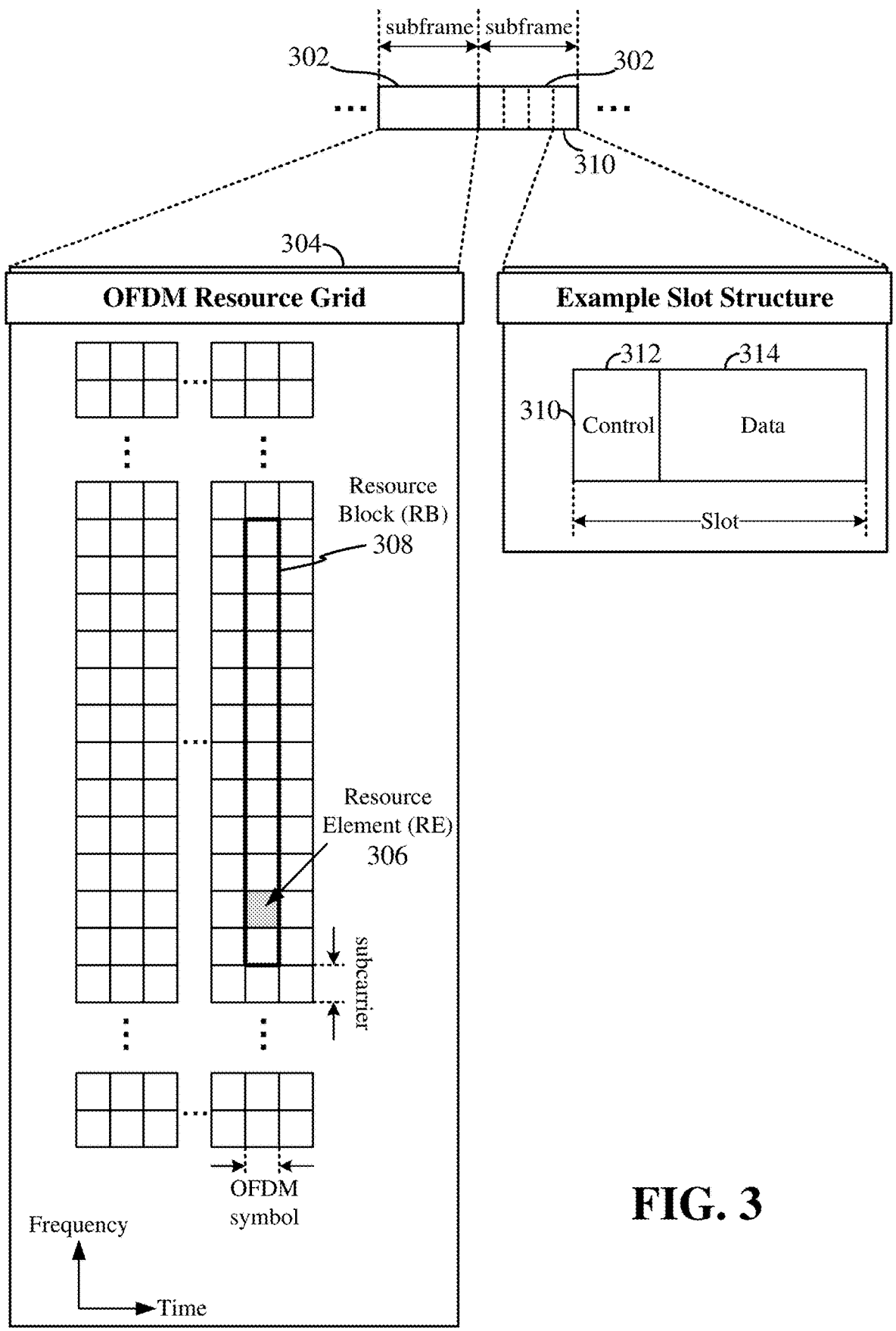
FIG. 3 is a schematic illustration of an organization of wireless resources in an air interface utilizing orthogonal frequency divisional multiplexing (OFDM) according to some embodiments.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the base station 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more UEs 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 306 to carry UL control information 118 (UCI). The UCI can originate from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB 1, discussed above. Here, the OSI may be provided in these SIBs, e.g., SIB2 and above.

The channels or carriers described above and illustrated in FIGS. 1 and 3 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In some aspects of the disclosure, the base station and/or UE may be configured for beamforming and/or multiple-input multiple-output (MIMO) technology. Beamforming generally refers to directional signal transmission or reception. For a beamformed transmission, the amplitude and phase of each antenna in an array of antennas may be precoded, or controlled to create a desired (e.g., directional) pattern of constructive and destructive interference in the wavefront.

Figure 4:
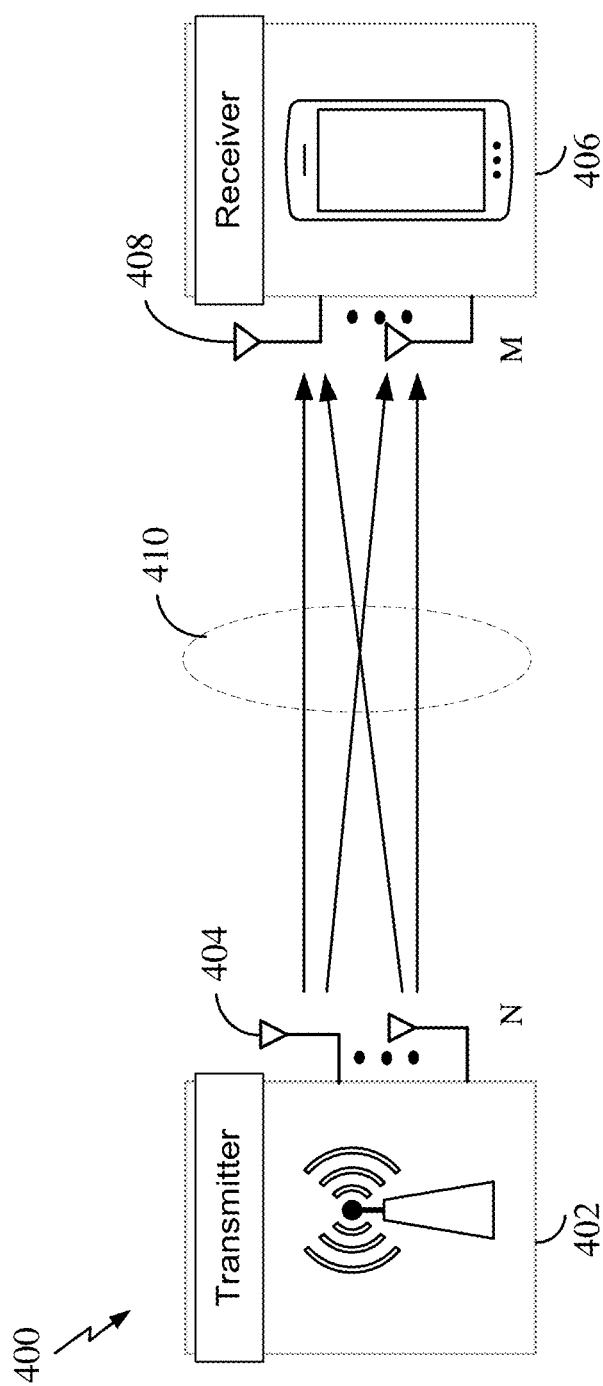
FIG. 4 is a block diagram illustrating a wireless communication system supporting multiple-input multiple-output (MIMO) communication.

FIG. 4 illustrates an example of a wireless communication system 400 supporting beamforming and/or MIMO. In such a system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a base station 108, a UE 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of a MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

As part of a host of features being implemented in 3GPP's 5G NR, millimeter-wave (mmW) signaling provides great promise. The term mmW generally refers to high bands above 20 GHz, which can provide a very large bandwidth. Because mmW signals may suffer from high path losses, cellular systems that utilize mmW beams may accordingly suffer from reduced reliability. To reduce the effects of such path losses, mmW-based cellular systems may utilize beamforming.

To utilize beamforming, both the base station and the UE may find and maintain suitable beams to enable a communication link. This procedure may be referred to as beam management, and in some examples, may utilize a beam sweeping procedure. As a part of beam management, beams that are used by the base station and the UE may be refined from time to time, due to changing channel conditions, movement of the UE or other objects, etc.

Figure 5:
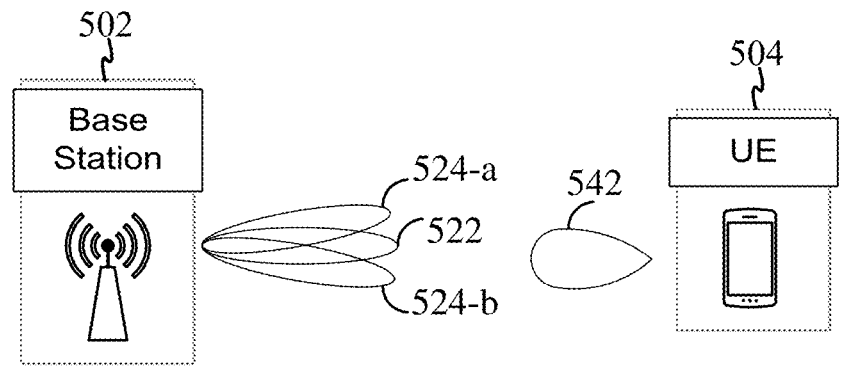
FIG. 5 is an illustration of two examples of beam management procedures known to those of ordinary skill in the art.
Figure 5:
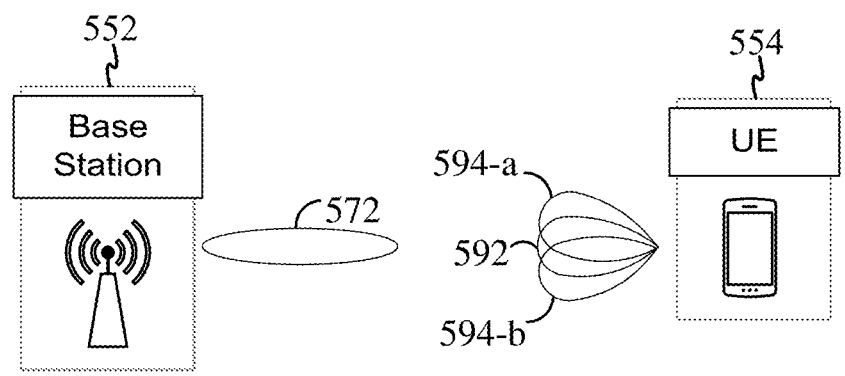

FIG. 5 illustrates two exemplary beam management procedures known to those of ordinary skill in the art. These illustrated beam management procedures utilize beam sweeping. A link between a base station and a UE involves a base station beam and a UE beam. The base station beam and the UE beam form what is known as a beam pair link (BPL).

Referring to Example 1, illustrated at the top of FIG. 5, a first exemplary beam management procedure may be utilized to refine the base station beam of a BPL. For example, a base station 502 may transmit using new beams 524-a and 524-b around an old beam 522. A UE 504 may keep its beam 542 constant, and measure one or more characteristics of each transmitted beam from the base station 502, such as a reference signal received power (RSRP), a channel quality, etc. Based on this measurement, the UE 504 may identify the base station beam (e.g., the old beam 522 or one of the new beams 524-a or 524-b) having the best performance, and report this best-performing beam back to the base station 502.

Referring now to Example 2, illustrated at the bottom of FIG. 5, a second exemplary beam management procedure may be utilized to refine the UE beam of a BPL. For example, a base station 552 may transmit utilizing an established beam 572 of a BPL, while a UE 554 may try out new beams 594-a and 594-b pointing in directions close to an old beam 592. The UE 554 may then measure one or more characteristics of each beam, and based on this measurement, the UE 554 may identify the beam having the best performance and report the performance to the base station 552.

5G NR generally refers to a family of technologies and the new radio access technology undergoing definition and standardization by 3GPP. Among this family of technologies, there has been considerable effort directed toward what is referred to as ultra-reliable and low-latency communication (URLLC). Sometimes URLLC may equivalently be called mission-critical communication. Here, reliability refers to the probability of success of transmitting a given number of bytes within 1 ms under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms. For comparison, a target latency for non-URLLC communication may be 4 ms.

To achieve a given latency target, in general, the successful delivery of a packet must not only take place, but the device transmitting that packet must at least receive an acknowledgment of this successful delivery. In an NR communication system, this means that the latency target is dependent on a transmission cycle. For downlink traffic, this includes transmission and reception of a downlink packet, UE processing of that packet, and UE transmission of an ACK/NACK indicating the success or failure of the packet. In the case that correct reception and decoding of the packet fails, the transmission cycle may further include the time for a base station to send a packet retransmission (e.g., a HARQ retransmission), and UE processing and acknowledgement of the retransmission. Depending on several factors such as the time length of the OFDM symbols being utilized for the communication link, a low latency target of 0.5 ms may only provide sufficient time for a single transmission. If a latency requirement is 1 ms, then, there may be sufficient time for an initial transmission as well as one retransmission.

In order to achieve an objective of having successful packet reception after the first or second transmission (first retransmission), a number of proposals have been made. One of these proposals includes repetitions (or replications) of a packet transmission in space (i.e., using multiple beams simultaneously), or using multiple Transmission Points (mTRPs). That is, a UE may receive a given packet in plural instances, over plural beams either transmitted from a single base station or transmission point (TRP), or from multiple base stations or TRPs.

Taking into consideration the exemplary beam management procedures described above and illustrated in FIG. 5, in the context of URLLC, it can be understood that meeting the latency requirements can be quite a challenging task, especially in cases of a single panel TRP, which imply that a single beam can be transmitted at a given time slot. Repetitions or replications of the transmitted signal in the spatial domain can provide a solution, but beam allocation is a considerable resource, especially at higher frequencies such as mmW signals. Therefore, the use of repetitions or replications in the spatial domain this solution can benefit from optimization.

In a given communication scenario, it may already be the case that spatial diversity is provided by a current or ongoing transmission (e.g., if MIMO is being utilized). In such a case, multi-beam transmission, either from the same TRP (if the TRP has more than one panel) or from mTRPs, may not be needed to achieve a given latency target. If a multi-beam transmission is unnecessarily used, this can result in an inefficient usage of resources, generation of excessive interference, increased power consumption, and/or a reduction in capacity (e.g., due to an inefficient usage of resources or increased interference).

For example, consider a UE bearing traffic that requires ultra-reliability and low latency, where the UE is communicating with two TRPs and each TRP is transmitting one beam. At a time when the radio link is good and there are no errors at the receiving UE, the use of multiple beams is a waste of resources and might increase power consumption at the UE. That is, a UE may utilize separate receiver chains, each consuming additional energy, to receive each beam. In addition, the use of an extra beam might generate other-cell interference.

One algorithm for addressing this issue may be to turn off multi-beam transmission, and utilize single-beam transmission, after N consecutive error-free receptions occur at a given UE. However, this algorithm may suffer from reduced reliability of packet reception in cases of unexpected changes in channel conditions such as blocking, fast UE movement, etc. In such a case, the single link to the UE might be broken. Furthermore, this algorithm may not provide for the detection of a need for multi-beam transmissions to commence before an erroneous reception occurs and a NACK is received at the base station.

Accordingly, various aspects of the present disclosure provide systems, apparatus, and methods for reducing or avoiding the issue of having unnecessary multi-beam transmissions, while additionally providing a way to detect a need for multi-beam transmissions for improved reliability. By utilizing the various aspects described herein, high reliability of communication can be achieved, while reducing issues relating to increased interference and increased UE power consumption.

For example, one aspect of this disclosure involves a UE reporting whether it receives more than one beam. A UE can detect the number of received beams based on a calculation of a number of eigenvectors of a covariance matrix of a receiver vector. Accordingly, a UE can report the number of eigenvectors of the covariance matrix. In another example, a UE can report whether a number of detected eigenvectors is greater than one. In still another example, a UE can report whether more than one beam is correctly received. In any case, this UE reporting enables the transmitter (e.g., a base station) to determine whether the receiving UE is receiving more than one beam.

For example, assume that a given transmitting device (e.g., a base station) transmits a single beam to a receiving device (e.g., a UE). Further, assume that the receiving UE correctly decodes a received transport block (e.g., a MAC protocol data unit, or PDU). In this case, the UE can calculate a covariance matrix of the received signals from its receiver antennas. That is, the signals received at the UE form a vector with a size equal to the number of receiver antennas. By calculating the covariance matrix, the receiving UE can accordingly calculate the eigenvectors of the covariance matrix of the received signal. If there is more than one eigenvector in the received signal, then this may imply that the single beam transmission provides, along with the correct transport block reception, spatial diversity. (In some examples, the detection of two separate eigenvectors at the receiving UE may imply receiver spatial diversity only when the directions of the eigenvectors indicate an angular spread larger than the beam width.) Accordingly, the use of a multi-beam transmission may not be necessary, and the transmitting base station can continue with the single-beam transmission.

Various aspects of the present disclosure provide for a UE to estimate the number of eigenvectors in the covariance matrix of the received vector. By doing this, the UE can detect if there is more than one beam, or more than one direction, received. If this number of beams is detected to be greater than one, then the UE can report that to the network. Accordingly, if high reliability is being achieved with a reduced number of beams, the network can deactivate the costly multi-beam transmission, saving on energy consumption at the UE. On the other hand, if high reliability is needed, and although packet failures may not necessarily be occurring, if a UE reports a low number of beams (e.g., one beam), the network can activate multi-beam transmission, increasing the reliability of the link.

Figure 6:
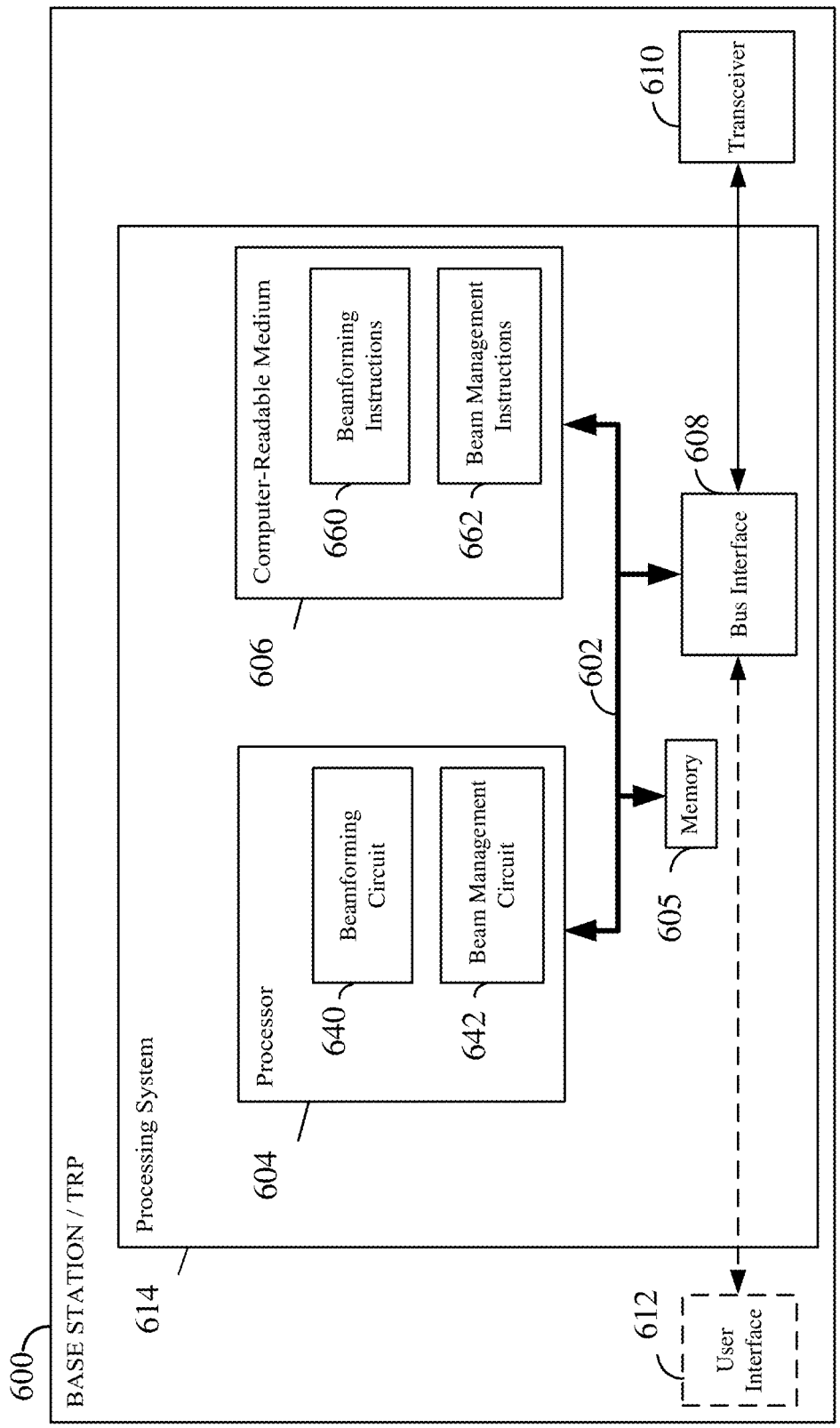
FIG. 6 is a block diagram conceptually illustrating an example of a hardware implementation for a base station according to some aspects of the disclosure.

FIG. 6 is a block diagram illustrating an example of a hardware implementation for a base station 600 employing a processing system 614. For example, the base station 600 may be a base station as illustrated in any one or more of FIGS. 1, 2, 4, and/or 5.

The base station 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 600 may be configured to perform any one or more of the functions described herein. That is, the processor 604, as utilized in a base station 600, may be used to implement any one or more of the processes and procedures described below and illustrated in FIG. 10.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Further, the transceiver 610 may include any suitable number of antennas, and any suitable number of antenna panels, for providing wireless communication utilizing one or more beams in a beamformed link. Depending upon the nature of the apparatus, a user interface 612 (e.g., keypad, display, speaker, microphone, joystick) may also be provided. Of course, such a user interface 612 is optional, and may be omitted in some examples, such as a base station.

In various aspects of the disclosure, the processor 604, or one or more components of the processor 604, may be referred to as a beam manager. In some aspects of the disclosure, the processor or beam manager 604 may include beamforming circuitry 640 configured for various functions, including, for example, enabling and/or disabling spatial beams and controlling a direction of those beams. For example, the beamforming circuitry 640 may be configured to implement one or more of the functions described below in relation to FIG. 10, including, e.g., block 1002. The processor or beam manager 604 may further include beam management circuitry 642 configured for various functions, including, for example, determining whether to alter a number of beams based on various factors, including but not limited to information corresponding to eigenvectors provided in a response from a receiving UE. For example, the beam management circuitry 642 may be configured to implement one or more of the functions described below in relation to FIG. 10, including, e.g., block 1008.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include beamforming software 660 configured for various functions, including, for example, enabling and/or disabling spatial beams and controlling a direction of those beams. For example, the beamforming software 660 may be configured to implement one or more of the functions described below in relation to FIG. 9, including, e.g., block 902. The computer-readable storage medium 606 may further include beam management software 662 configured for various functions, including, for example, determining whether to alter a number of beams based on various factors, including but not limited to information corresponding to eigenvectors provided in a response from a receiving UE. For example, the beam management software 662 may be configured to implement one or more of the functions described below in relation to FIG. 9, including, e.g., block 908.

In one configuration, the base station or TRP 600 includes means for transmitting a packet to a multi-antenna receiving device utilizing a first number of beams; means for receiving a response to the packet, the response including information corresponding to one or more eigenvectors of at least one covariance matrix corresponding to a covariance of signals from each of a plurality of receive antennas at the multi-antenna receiving device, used to receive the packet; means for determining, based on the response, whether to alter a number of beams to a second number of beams, different from the first number of beams; and means for transmitting an instruction for a second TRP to either commence transmission of one or more beams to the multi-antenna receiving device, or to terminate transmission of one or more beams to the multi-antenna receiving device. In one aspect, the aforementioned means may be the processor(s) 604 and/or memory 605 shown in FIG. 6 configured to perform the functions recited by the aforementioned means. In another aspect, the aforementioned means may be the beam manager 834 shown in FIG. 8 configured to perform the functions recited by the aforementioned means. In another aspect, the aforementioned means may be a circuit, or any apparatus configured to perform the functions recited by the aforementioned means.

Figure 10:
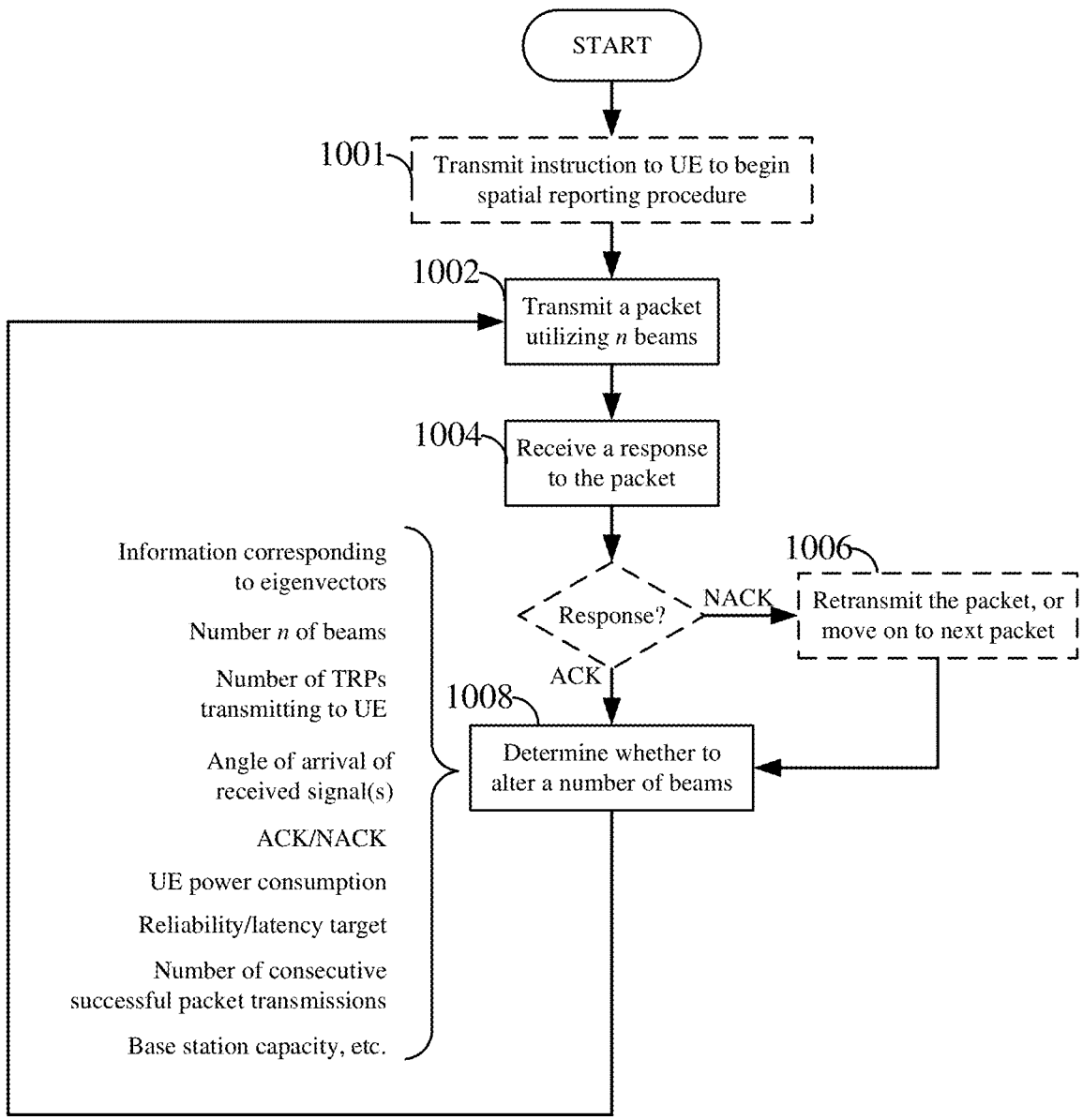
FIG. 10 is a flow chart illustrating an exemplary process for a base station to utilize eigenvectors of a covariance matrix as part of a beam management procedure according to some aspects of the disclosure.

Of course, in the above examples, the circuitry included in the processor 604 and/or beam manager 834 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 4, 6, and/or 8, and utilizing, for example, the processes and/or algorithms described herein in relation to FIG. 10.

Figure 7:
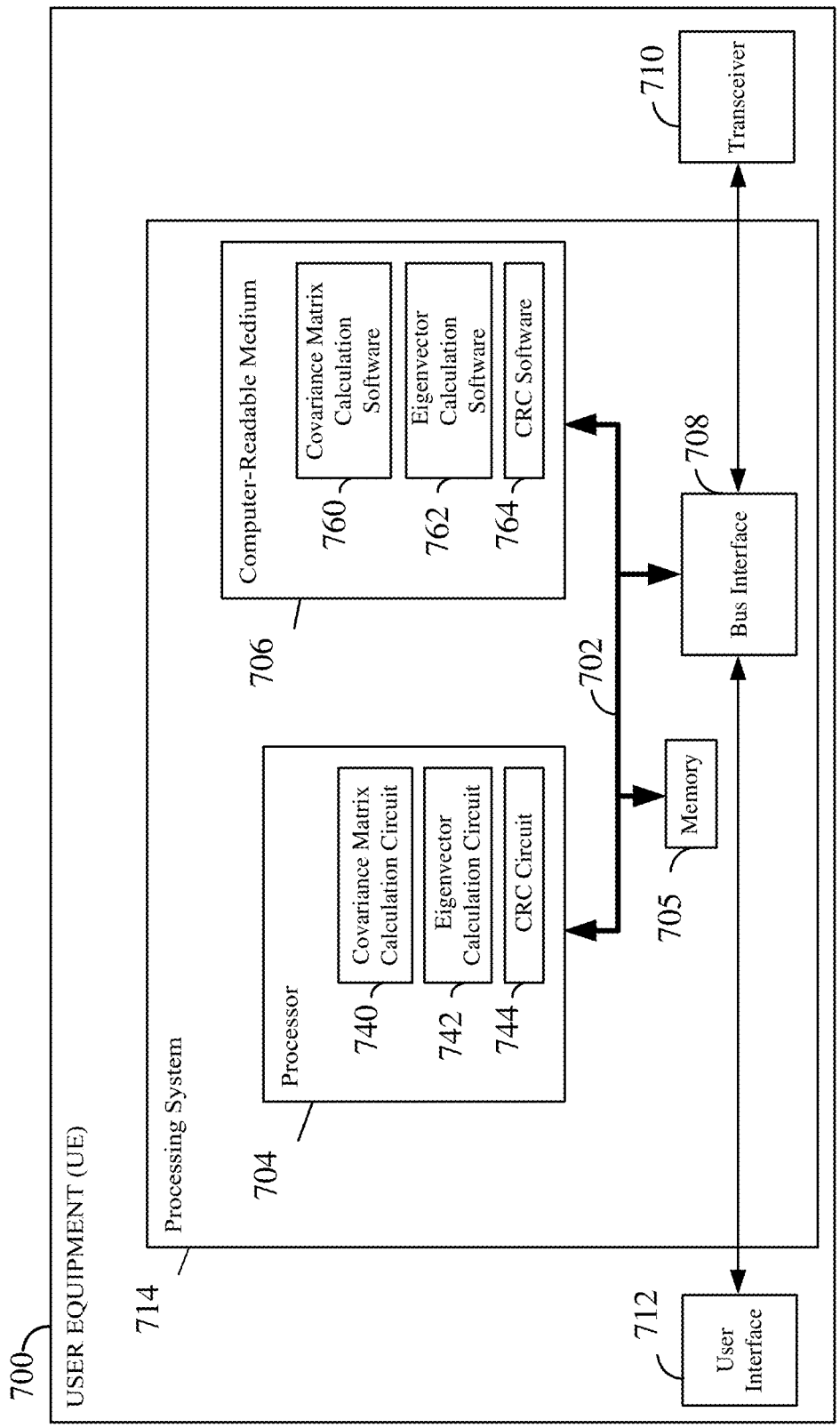
FIG. 7 is a block diagram conceptually illustrating an example of a hardware implementation for a user equipment (UE) according to some aspects of the disclosure.

FIG. 7 is a conceptual diagram illustrating an example of a hardware implementation for an exemplary UE 700 employing a processing system 714. In accordance with various aspects of the disclosure, an element, or any portion of an element, or any combination of elements may be implemented with a processing system 714 that includes one or more processors 704. For example, the UE 700 may be the UE as illustrated in any one or more of FIGS. 1, 2, 4, and/or 5.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6. In some examples, the transceiver 710 may include a plurality of antennas. Further, the transceiver 710 may include a plurality of receiver chains for receiving separate downlink beams, respectively. The processor 704, as utilized in a scheduled entity 700, may be used to implement any one or more of the processes described below and illustrated in FIG. 9.

In various aspects of the disclosure, the processor 704 may be referred to as a beam manager. In some aspects of the disclosure, the processor or beam manager 704 may include covariance matrix calculation circuitry 740 configured for various functions, including, for example, calculating one or more covariance matrices corresponding to a covariance of signals, from each of a plurality of receive antennas, corresponding to a received packet. For example, the covariance matrix calculation circuitry 740 may be configured to implement one or more of the functions described below in relation to FIG. 9, including, e.g., block 910. The processor or beam manager 704 may further include eigenvector calculation circuitry 742 configured for various functions, including, for example, calculating one or more eigenvectors of the covariance matrix. For example, the eigenvector calculation circuitry 742 may be configured to implement one or more of the functions described below in relation to FIG. 9, including, e.g., block 912. The processor or beam manager 704 may further include integrity checking circuitry 744 configured for various functions, including, for example, calculating a cyclic redundancy check (CRC) of a received packet. For example, the integrity checking circuitry 744 may be configured to implement one or more of the functions described below in relation to FIG. 9, including, e.g., block 906.

In one configuration, the UE 700 includes means for receiving a packet utilizing a plurality of antennas; means for calculating at least one covariance matrix corresponding to a covariance of signals, from each of the plurality of antennas, corresponding to the received packet; means for calculating one or more eigenvectors of each covariance matrix of the at least one covariance matrix; means for transmitting a response to the received packet, the response including information corresponding to the calculated one or more eigenvectors; means for transmitting a request to begin reporting the information corresponding to the calculated one or more eigenvectors; and/or means for receiving a request to begin reporting the information corresponding to the calculated one or more eigenvectors. In one aspect, the aforementioned means may be the processor(s) 704 shown in FIG. 7 and/or the beam manager 834 configured to perform the functions recited by the aforementioned means. In another aspect, the aforementioned means may be a circuit, or any apparatus configured to perform the functions recited by the aforementioned means.

Figure 9:
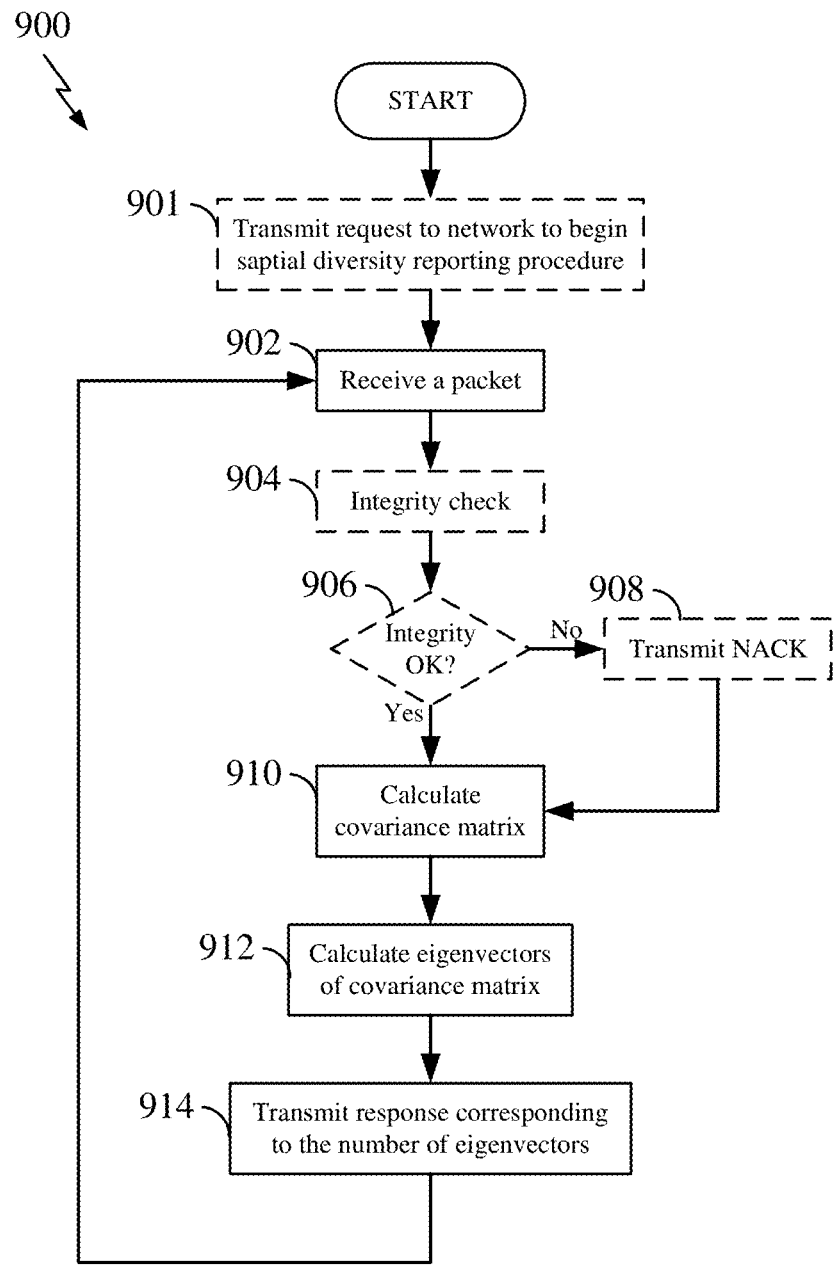
FIG. 9 is a flow chart illustrating an exemplary process for a UE to utilize calculation of eigenvectors of a covariance matrix as a part of a beam management procedure according to some aspects of the disclosure.

Of course, in the above examples, the circuitry included in the processor 704 and/or the beam manager 834 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 4, 5, 7, and/or 8, and utilizing, for example, the processes and/or algorithms described herein in relation to FIG. 9.

Figure 8:
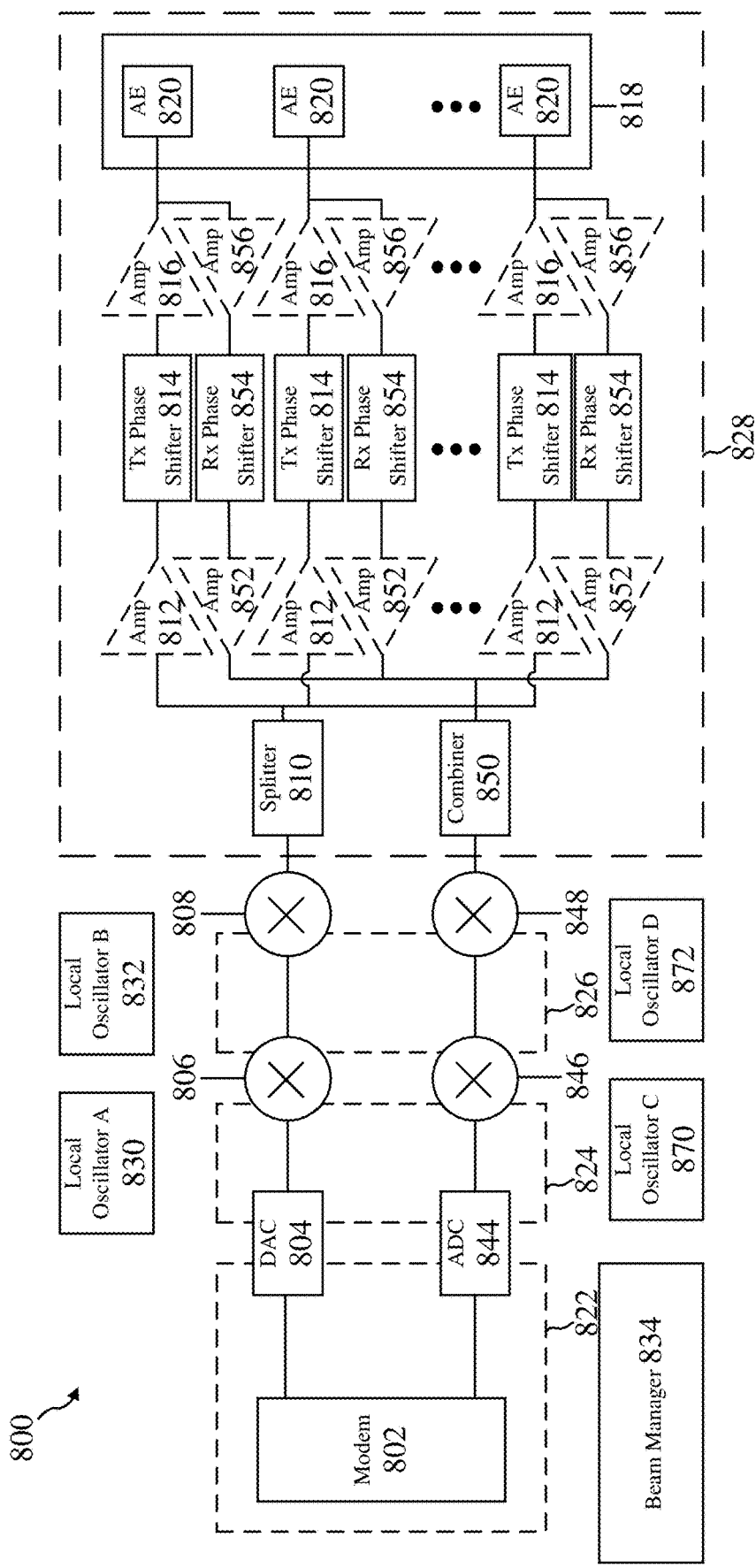
FIG. 8 is a block diagram illustrating an example of a beamforming architecture according to some aspects of the disclosure.

FIG. 8 illustrates an example of an architecture 800 that supports determining sub-dominant clusters in a mmW channel in accordance with aspects of the present disclosure. In some examples, architecture 800 may implement aspects of wireless communication system 100 illustrated in FIG. 1. In some aspects, diagram 800 may be an example of a transceiver, e.g., the transceiver 610 of a first wireless device or base station 600, and/or the transceiver 710 of a second wireless device or UE 700, as described herein.

Broadly, FIG. 8 is a diagram illustrating example hardware components of a wireless device in accordance with certain aspects of the disclosure. The illustrated components may include those that may be used for beamforming for transmission of wireless signals. There are numerous architectures for antenna element selection and implementing phase shifting, only one example of which is illustrated here. The architecture 800 includes a modem (modulator/demodulator) 802, a digital to analog converter (DAC) 804, a first mixer 806, a second mixer 808, and a splitter 810. The architecture 800 also includes a plurality of first amplifiers 812, a plurality of phase shifters 814, a plurality of second amplifiers 816, and an antenna array 818 that includes a plurality of antenna elements 820. Transmission lines or other waveguides, wires, traces, or the like are shown connecting the various components to illustrate how signals to be transmitted may travel between components. Boxes 822, 824, 826, and 828 indicate regions in the architecture 800 in which different types of signals travel or are processed. Specifically, box 822 indicates a region in which digital baseband signals travel or are processed, box 824 indicates a region in which analog baseband signals travel or are processed, box 826 indicates a region in which analog intermediate frequency (IF) signals travel or are processed, and box 828 indicates a region in which analog radio frequency (RF) signals travel or are processed. The architecture also includes a local oscillator A 830, a local oscillator B 832, and a beam manager 834.

Each of the antenna elements 820 may include one or more sub-elements (not shown) for radiating or receiving RF signals. For example, a single antenna element 820 may include a first sub-element cross-polarized with a second sub-element that can be used to independently transmit cross-polarized signals. The antenna elements 820 may include patch antennas or other types of antennas arranged in a linear, two dimensional, or another pattern. A spacing between antenna elements 820 may be such that signals with a desired wavelength transmitted separately by the antenna elements 820 may interact or interfere (e.g., to form a desired beam). For example, given an expected range of wavelengths or frequencies, the spacing may provide a quarter wavelength, half wavelength, or other fraction of a wavelength of spacing between neighboring antenna elements 820 to allow for interaction or interference of signals transmitted by the separate antenna elements 820 within that expected range.

The modem 802 processes and generates digital baseband signals and may also control operation of the DAC 804, first and second mixers 806, 808, splitter 810, first amplifiers 812, phase shifters 814, and/or the second amplifiers 816 to transmit signals via one or more or all of the antenna elements 820. The modem 802 may process signals and control operation in accordance with a communication standard such as a wireless standard discussed herein. The DAC 804 may convert digital baseband signals received from the modem 802 (and that are to be transmitted) into analog baseband signals. The first mixer 806 upconverts analog baseband signals to analog IF signals within an IF using a local oscillator A 830. For example, the first mixer 806 may mix the signals with an oscillating signal generated by the local oscillator A 830 to "move" the baseband analog signals to the IF. In some cases some processing or filtering (not shown) may take place at the IF. The second mixer 808 upconverts the analog IF signals to analog RF signals using the local oscillator B 832. Similarly to the first mixer, the second mixer 808 may mix the signals with an oscillating signal generated by the local oscillator B 832 to "move" the IF analog signals to the RF, or the frequency at which signals will be transmitted or received. The modem 802 and/or the beam manager 834 may adjust the frequency of local oscillator A 830 and/or the local oscillator B 832 so that a desired IF and/or RF frequency is produced and used to facilitate processing and transmission of a signal within a desired bandwidth.

In the illustrated architecture 800, signals upconverted by the second mixer 808 are split or duplicated into multiple signals by the splitter 810. The splitter 810 in architecture 800 splits the RF signal into a plurality of identical or nearly identical RF signals, as denoted by its presence in box 828. In other examples, the split may take place with any type of signal including with baseband digital, baseband analog, or IF analog signals. Each of these signals may correspond to an antenna element 820 and the signal travels through and is processed by amplifiers 812, 816, phase shifters 814, and/or other elements corresponding to the respective antenna element 820 to be provided to and transmitted by the corresponding antenna element 820 of the antenna array 818. In one example, the splitter 810 may be an active splitter that is connected to a power supply and provides some gain so that RF signals exiting the splitter 810 are at a power level equal to or greater than the signal entering the splitter 810. In another example, the splitter 810 is a passive splitter that is not connected to power supply and the RF signals exiting the splitter 810 may be at a power level lower than the RF signal entering the splitter 810.

After being split by the splitter 810, the resulting RF signals may enter an amplifier, such as a first amplifier 812, or a phase shifter 814 corresponding to an antenna element 820. The first and second amplifiers 812, 816 are illustrated with dashed lines because one or both of them might not be necessary in some implementations. In one implementation, both the first amplifier 812 and second amplifier 814 are present. In another, neither the first amplifier 812 nor the second amplifier 814 is present. In other implementations, one of the two amplifiers 812, 814 is present but not the other. By way of example, if the splitter 810 is an active splitter, the first amplifier 812 may not be used. By way of further example, if the phase shifter 814 is an active phase shifter that can provide a gain, the second amplifier 816 might not be used. The amplifiers 812, 816 may provide a desired level of positive or negative gain. A positive gain (positive dB) may be used to increase an amplitude of a signal for radiation by a specific antenna element 820. A negative gain (negative dB) may be used to decrease an amplitude and/or suppress radiation of the signal by a specific antenna element. Each of the amplifiers 812, 816 may be controlled independently (e.g., by the modem 802 or beam manager 834) to provide independent control of the gain for each antenna element 820. For example, the modem 802 and/or the beam manager 834 may have at least one control line connected to each of the splitter 810, first amplifiers 812, phase shifters 814, and/or second amplifiers 816 which may be used to configure a gain to provide a desired amount of gain for each component and thus each antenna element 820.

The phase shifter 814 may provide a configurable phase shift or phase offset to a corresponding RF signal to be transmitted. The phase shifter 814 could be a passive phase shifter not directly connected to a power supply. Passive phase shifters might introduce some insertion loss. The second amplifier 816 could boost the signal to compensate for the insertion loss. The phase shifter 814 could be an active phase shifter connected to a power supply such that the active phase shifter provides some amount of gain or prevents insertion loss. The settings of each of the phase shifters 814 are independent meaning that each can be set to provide a desired amount of phase shift or the same amount of phase shift or some other configuration. The modem 802 and/or the beam manager 834 may have at least one control line connected to each of the phase shifters 814 and which may be used to configure the phase shifters 814 to provide a desired amounts of phase shift or phase offset between antenna elements 820.

In the illustrated architecture 800, RF signals received by the antenna elements 820 are provided to one or more of first amplifier 856 to boost the signal strength. The first amplifier 856 may be connected to the same antenna arrays 818, e.g., for TDD operations. The first amplifier 856 may be connected to different antenna arrays 818. The boosted RF signal is input into one or more of phase shifter 854 to provide a configurable phase shift or phase offset for the corresponding received RF signal. The phase shifter 854 may be an active phase shifter or a passive phase shifter. The settings of the phase shifters 854 are independent, meaning that each can be set to provide a desired amount of phase shift or the same amount of phase shift or some other configuration. The modem 802 and/or the beam manager 834 may have at least one control line connected to each of the phase shifters 854 and which may be used to configure the phase sifters 854 to provide a desired amount of phase shift or phase offset between antenna elements 820.

The outputs of the phase shifters 854 may be input to one or more second amplifiers 852 for signal amplification of the phase shifted received RF signals. The second amplifiers 852 may be individually configured to provide a configured amount of gain. The second amplifiers 852 may be individually configured to provide an amount of gain to ensure that the signal input to combiner 850 have the same magnitude. The amplifiers 852 and/or 856 are illustrated in dashed lines because they might not be necessary in some implementations. In one implementation, both the amplifier 852 and the amplifier 856 are present. In another, neither the amplifier 852 nor the amplifier 856 are present. In other implementations, one of the amplifiers 852, 856 is present but not the other.

In the illustrated architecture 800, signals output by the phase shifters 854 (via the amplifiers 852 when present) are combined in combiner 850. The combiner 850 in architecture combines the RF signal into a signal, as denoted by its presence in box 828. The combiner 850 may be a passive combiner, e.g., not connected to a power source, which may result in some insertion loss. The combiner 850 may be an active combiner, e.g., connected to a power source, which may result in some signal gain. When combiner 850 is an active combiner, it may provide a different (e.g., configurable) amount of gain for each input signal so that the input signals have the same magnitude when they are combined. When combiner 850 is an active combiner, it may not need the second amplifier 852 because the active combiner may provide the signal amplification.

The output of the combiner 850 is input into mixers 848 and 846. Mixers 848 and 846 generally down convert the received RF signal using inputs from local oscillators 872 and 870, respectively, to create intermediate or baseband signals that carry the encoded and modulated information. The output of the mixers 848 and 846 are input into an analog-to-digital converter (ADC) 844 for conversion to analog signals. The analog signals output from ADC 844 is input to modem 802 for baseband processing, e.g., decoding, de-interleaving, etc.

The architecture 800 is given by way of example only to illustrate an architecture for transmitting and/or receiving signals. It will be understood that the architecture 800 and/or each portion of the architecture 800 may be repeated multiple times within an architecture to accommodate or provide an arbitrary number of RF chains, antenna elements, and/or antenna panels. Furthermore, numerous alternate architectures are possible and contemplated. For example, although only a single antenna array 818 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 822, 824, 826, 828) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 810, amplifiers 812, 816, or phase shifters 814 may be located between the DAC 804 and the first mixer 806 or between the first mixer 806 and the second mixer 808. In one example, the functions of one or more of the components may be combined into one component. For example, the phase shifters 814 may perform amplification to include or replace the first and/or or second amplifiers 812, 816. By way of another example, a phase shift may be implemented by the second mixer 808 to obviate the need for a separate phase shifter 814. This technique is sometimes called local oscillator (LO) phase shifting. In one implementation of this configuration, there may be a plurality of IF to RF mixers (e.g., for each antenna element chain) within the second mixer 808 and the local oscillator B 832 would supply different local oscillator signals (with different phase offsets) to each IF to RF mixer.

The modem 802 and/or the beam manager 834 may control one or more of the other components 804-472 to select one or more antenna elements 820 and/or to form beams for transmission of one or more signals. For example, the antenna elements 820 may be individually selected or deselected for transmission of a signal (or signals) by controlling an amplitude of one or more corresponding amplifiers, such as the first amplifiers 812 and/or the second amplifiers 816. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 820, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 818) can be dynamically controlled by modifying the phase shifts or phase offsets imparted by the phase shifters 814 and amplitudes imparted by the amplifiers 812, 816 of the plurality of signals relative to each other.

The beam manager 834 may, when architecture 800 is configured as a receiving device, transmit a first beam measurement report to a first wireless device, the first beam measurement report indicating a first set of beam measurements for a wireless channel between the first wireless device and the second wireless device. The beam manager 834 may receive from the first wireless device a cluster validity metric for at least one beam in the first beam measurement report. The beam manager 834 may transmit to the first wireless device a second beam measurement report based at least in part on the cluster validity metric, the second beam measurement report indicating a second set of beam measurements for the wireless channel, as discussed herein. The beam manager 834 may, when architecture 800 is configured as a transmitting device, receive a first beam measurement report from a second wireless device, the first beam measurement report indicating a first set of beam measurements for a wireless channel between the first wireless device and the second wireless device. The beam manager 834 may transmit to the second wireless device a cluster validity metric for at least one beam in the first beam measurement report. The beam manager 834 may receive from the second wireless device, in response to transmitting the cluster validity metric, a second beam measurement report indicating a second set of beam measurements for the wireless channel. The beam manager 834 may select a beam for transmitting to the second wireless device based at least in part on the first and second beam measurement reports, as discussed herein. The beam manager 834 may be located partially or fully within one or more other components of the architecture 800. For example, the beam manager 834 may be located within the modem 802 in at least one implementation.

FIG. 9 is a flow chart illustrating an exemplary process 900 for spatial diversity reporting in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the UE 700 illustrated in FIG. 7. In some examples, the process 900 may be carried out by any suitable apparatus or means for carrying out the functions or algorithm described below.

At optional block 901, a UE 700 may transmit a request for the network to begin a spatial diversity reporting procedure based on estimation of eigenvectors of a covariance matrix. For example, if a UE 700 is beginning an application that requires URLLC communication, or if the UE 700 has a need to save on battery power, for example, or for any other suitable reason, then the UE 700 can transmit a request that it can begin a process to begin estimation of eigenvectors of a covariance matrix.

At block 902, a UE 700 may receive a packet (e.g., a downlink packet) utilizing a plurality of antennas. The packet may arrive on any number of beams, such as one or more beams Here, when the one or more beams is a plurality of beams, those beams may arrive from any suitable number of transmission points (TRPs) (e.g., one or more TRPs). When the UE receives the packet, the UE 700 may store samples of the signals received from each of the plurality of antennas in a memory 705. In an example where the packet is received over a plurality of beams, the UE 700 may store samples of the signal from each antenna, for each beam, separately in memory. For example, if a packet is received using two beams, then the UE 700 may store two sets of samples per antenna in memory: one corresponding to each beam, per antenna.

At block 904, the UE may perform an integrity check on the received packet. Any suitable integrity check may be utilized in a given example, including but not limited to a cyclic redundancy check (CRC), a checksum, etc. The UE may utilize the integrity check to determine whether the received packet was correctly received without bit errors, or with a sufficiently low amount of bit errors such that error correction can provide for error-free recovery of the information in the packet.

At block 906, the UE may determine whether the packet was correctly received and decoded, based on the integrity check. If the integrity check fails, then at block 908 the UE may transmit a NACK, which may request retransmission of the packet. In the illustration of FIG. 9, the procedure shows that even though the integrity check failed, the UE 700 may still proceed to steps 910 et seq., and may still calculate a covariance matrix and its eigenvectors, as described below. That is, according to some examples, despite whatever errors caused the integrity check to fail, it may still be useful for a base station to have the information about the covariance matrix. In other examples, if an integrity check fails, then after block 908 the process may return, e.g., to block 902, and wait for the next packet, without determining the covariance matrix and its eigenvalues for the failed packet.

If the integrity check is successful, then the process may proceed to block 910. At block 910, the UE may calculate a covariance matrix corresponding to a covariance of signals, from each of the antennas, corresponding to the received packet. For example, as described above, samples of the signal received at each antenna, corresponding to the received packet, may be recovered from the memory 705. As an example, for a UE 700 that includes two antennas, two corresponding sets of samples of the received signal may be in memory, with one set of samples corresponding to each antenna. In general, with an n-antenna example, the UE 700 calculates a covariance matrix corresponding to the covariance of n sets of samples. A covariance is a statistical calculation well-known to those of ordinary skill in the art, so details of the calculation are not provided in the present disclosure. In general, a covariance matrix based on samples from n antennas, given by coy $(S_1, \ldots S_n)$, is an n×n matrix, where $S_a$ represents the set of samples corresponding to antenna a.

In a further example, if the packet received at block 902 is received over a plurality of beams, then at block 910 the UE may calculate a plurality of covariance matrices, one corresponding to each beam. That is, as described above, a UE receiving a packet on multiple beams may store n sets of samples corresponding to its n antennas. However, if the packet is received on b beams, then the UE may store b·n sets of samples, with one set of samples per beam per antenna. In this way, the UE 700 may calculate b covariance matrices corresponding to the b beams.

At block 912, the UE 700 may calculate eigenvectors of the covariance matrix (or matrices) determined at block 910. Eigenvectors, or characteristic vectors of a matrix statistically characterize the matrix. The calculation of eigenvectors is well-known to those of ordinary skill in the art, so details of the calculation are not provided in the present disclosure. Based on the properties of a matrix, a given matrix can have one or more eigenvectors. In a case where a UE 700 calculates a plurality of covariance matrices corresponding to a plurality of beams, those of ordinary skill in the art will understand that cross-beam interference may adversely affect the accuracy of eigenvector estimation.

According to an aspect of the present disclosure, a UE 700 can interpret the number of eigenvectors of the determined covariance matrix as an indication of a number of beams received at the UE 700. Put another way, if the covariance matrix indicates a number of eigenvectors greater than one, then the UE 700 can interpret this as an indication that the signal is received in more than one direction. For example, the determined number of eigenvectors may be equal to the number of received beams. In another example, any number of eigenvectors greater than one may be taken as an indication of spatial diversity, i.e., wherein two or more beams are received at the UE. In a still further example, the detection of two separate eigenvectors at the receiving UE may imply receiver spatial diversity only when the directions of the eigenvectors indicate an angular spread larger than the beam width. That is, a UE 700, may store (or, in another example, calculate) information indicating a beam width. Here, the UE may calculate an angle based on each of the eigenvectors. Accordingly, the UE 700 may determine an angular spread between two eigenvectors of a calculated covariance matrix, and compare this angular spread with the beam width to arrive at a determination whether greater than one beam is received.

Accordingly, at block 914, the UE 700 may transmit a response to the received packet from block 902. In some examples, when the packet is successfully received and decoded according to the integrity check, this response may include an acknowledgment (ACK) of the packet. The response may include information corresponding to the calculated number of eigenvectors from block 912. For example, the response may include a report of the number of eigenvectors that the UE calculated based on the covariance matrix from block 910. In another example, the response may include a report as to whether the calculated number of eigenvectors of the covariance matrix is greater than one. In still another example, the response may include a report as to whether the received packet from block 902 was received over greater than one beam, based on the calculated number of eigenvectors of the covariance matrix. In another example, the response may include information indicating a beam width of a received beam, calculated based on an angular spread of calculated eigenvectors.

FIG. 10 is a flow chart illustrating an exemplary process 1000 for beam management based on spatial diversity reporting in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the base station 600 illustrated in FIG. 6. In some examples, the process 1000 may be carried out by any suitable apparatus or means for carrying out the functions or algorithm described below.

At optional block 1001, a base station 600 may transmit an instruction to a UE to begin a spatial diversity reporting procedure based on estimation of eigenvectors of a covariance matrix. For example, if the base station 600 is in need of beams due to congestion, high loading, etc., or if the base station 600 is serving UEs that are reliably receiving packets and seem not to need multiple beams, then the base station 600 can request UEs to begin estimation of eigenvectors of a covariance matrix. In this way, multiple beams may not be transmitted to that UE if they are not needed.

At block 1002, a base station 600 may transmit a packet (e.g., a downlink packet) utilizing any suitable number of beams (e.g., n beams) Here, the base station 600 may be acting as a single transmission point (TRP). In another example, the base station may be acting as one of a plurality of TRPs in a multiple transmission point (mTRP) example.

At block 1004, the base station 600 may receive a response to the packet from block 1002. The response may include an ACK/NACK indicating whether a receiving device (e.g., a UE) correctly received and decoded the packet. Here, if the response includes a NACK, then the process may proceed to block 1006, and the base station 600 may retransmit the packet, or move on to a next packet, according to a suitable retransmission (e.g., a HARQ retransmission) procedure. According to some examples, if the packet is not correctly received and the base station 600 receives the NACK, then the base station 600 may accordingly determine that an adjustment of the transmission is needed to achieve ultra-reliable communication. Accordingly, the process may proceed to block 1008, as described below.

If the response received at block 1004 includes an ACK, then the process may proceed to block 1008.

At block 1008, the base station 600 may determine, based on the response from block 1004, whether to alter a number of beams for transmission of packets to the receiving device. For example, the base station 600 may alter a number of beams from a first number of beams to a second number of beams, different from the first number of beams. Alternatively, the base station 600 may maintain the first number of beams for future transmissions. This determination may be based on a variety of factors. For example, this determination may be based, at least in part, on the response from block 1004, including but not limited to the ACK/NACK. That is, the response from block 1004 may additionally or alternatively include information corresponding to one or more eigenvectors of a covariance matrix calculated by a multi-antenna receiving device, the covariance matrix corresponding to a covariance of signals from each of a plurality of receiving antennas at the receiving device, used to receive the packet. This information may, in some examples, explicitly indicate the number of eigenvectors that the UE calculated based on the covariance matrix. In some examples, this information may include a report as to whether the number of eigenvectors of the covariance matrix is greater than one. In some examples, this information may include a report as to whether the receiving device received the packet over greater than one beam, based on the number of eigenvectors of the covariance matrix. In other examples, this information may include any other suitable information corresponding to one or more eigenvectors of a covariance matrix calculated as described in this disclosure.

A determination whether to alter the number of beams for transmission of packets to the receiving device may be based, in part, on an ACK/NACK response to a packet. The determination may additionally or alternatively be based, in part, on the number n of beams utilized for transmitting the packet to the receiving device at block 1002. The determination may additionally or alternatively be based, in part, on a reliability target and/or a latency target of communication with the receiving device. The determination may additionally or alternatively be based, in part, on whether the transmitting base station 600 is the sole transmission point (TRP), or one of multiple TRPs transmitting packets to the receiving device. The determination may additionally or alternatively be based, in part, on the number of consecutive successful packet transmissions to a given UE. The determination may additionally or alternatively be based, in part, on the power consumption and/or remaining battery power of a receiving device. The determination may additionally or alternatively be based, in part, on the capacity of the base station 600, network loading or congestion, the number of UEs being served by the base station, interference levels in the cell, or the need for resources for serving other UEs. The determination may additionally or alternatively be based, in part, on the angle(s) of arrival of the received signal. These angles of arrival may be based on the base station 600 performing an analysis of the eigenvectors of the covariance matrix or covariance matrices. Of course, those of ordinary skill in the art will comprehend that this list of examples is merely illustrative in nature, and other factors may play into a determination whether to alter a number of beams within the scope of this disclosure.

For example, according to an aspect of this disclosure, if the base station 600 transmitted the packet at block 1002 utilizing a single beam, and if the response received at block 1004 indicates that the UE received the packet from only one direction (e.g., the response indicates that the covariance matrix has only one eigenvector), then at block 1008, the base station 600 may determine to activate multi-beam transmission to the receiving device. In this manner, multi-beam transmission can be activated for a given UE even without necessarily having a single packet fail to be correctly received and decoded at a UE. Here, activation of multi-beam transmission may be accomplished by activating multiple beams from the same TRP (i.e., the base station 600 itself). In another example, activation of multi-beam transmission may be accomplished by the activation of transmission of one or more beams from one or more other TRPs other than the base station 600.

In another example, if the base station 600 transmitted the packet at block 1002 utilizing a single beam, and if the response received at block 1004 indicates that the number of eigenvectors is greater than one, then the base station 600 can continue utilizing single-beam transmissions for future packets. That is, in this circumstance the base station can save on resources that can be allocated to other users with improved confidence that the receiving device may continue to receive packets with a high reliability.

In another example, at block 1008 a base station 600 can utilize this procedure to activate multi-beam transmission to a given UE, even after correct reception of a packet at the UE. This can be useful when sending data where ultra-high reliability is needed. In a further aspect of this disclosure, a base station can utilize this procedure to deactivate multi-beam transmission to a given UE after greater than a threshold number of successful packet transmissions to the UE, where the UE responds to those transmissions with an indication of greater than one detected eigenvector.

In another example, at block 1008, a base station 600 can utilize this procedure to coordinate interference, e.g., by reducing transmission from other neighbors in a specific direction. That is, when the base station 600 calculates angles of arrival of a received signal based on an analysis of the eigenvectors, the base station 600 can determine that one or more beams may be causing undue interference at the UE, and can coordinate with one or more other TRPs to reduce such interference.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at an apparatus, comprising:
   receiving a packet utilizing a plurality of antennas;
   calculating at least one covariance matrix corresponding to a covariance of signals, from each of the plurality of antennas, corresponding to the received packet;
   calculating one or more eigenvectors of each covariance matrix of the at least one covariance matrix; and
   transmitting a response to the received packet, the response comprising information corresponding to the calculated one or more eigenvectors,
   wherein the information corresponding to the calculated one or more eigenvectors comprises one or more of:
      a number of the calculated one or more eigenvectors of the at least one covariance matrix;
      information indicating whether the number of the calculated one or more eigenvectors of the at least one covariance matrix is greater than one;
      information indicating whether the received packet was received over greater than one beam based on the number of the calculated one or more eigenvectors of the at least one covariance matrix; or
      information indicating a beam width of a received beam, calculated based on an angular spread of the calculated one or more eigenvectors.

2. The method of claim 1, further comprising:
   transmitting a request to begin reporting the information corresponding to the calculated one or more eigenvectors.

3. The method of claim 1, further comprising:
   receiving a request to begin reporting the information corresponding to the calculated one or more eigenvectors.

4. A method of wireless communication operable at a first transmission point (TRP), the method comprising:
   transmitting a packet to a multi-antenna receiving device, utilizing a first number of beams;
   receiving a response to the packet, the response comprising information corresponding to one or more eigenvectors of at least one covariance matrix corresponding to a covariance of signals from each of a plurality of receive antennas at the multi-antenna receiving device, used to receive the packet; and
   determining, based on the response, whether to alter a number of beams to a second number of beams, different from the first number of beams,
   wherein the information corresponding to the one or more eigenvectors comprises one or more of:
      a number of the one or more eigenvectors of the at least one covariance matrix;
      information indicating whether the number of the one or more eigenvectors of the at least one covariance matrix is greater than one;
      information indicating whether the multi-antenna receiving device received the packet over greater than one beam based on the number of the one or more eigenvectors of the at least one covariance matrix; or
      information indicating a beam width of a received beam, the beam width based on an angular spread of the one or more eigenvectors.

5. The method of claim 4, wherein the determining, based on the response, whether to alter the number of beams comprises determining whether to alter the number of beams based further on one or more of:
   the first number of beams;
   a number of transmission points, including the first TRP, transmitting to the multi-antenna receiving device;
   an acknowledgment or negative acknowledgment (ACK/NACK) received from the multi-antenna receiving device, indicating whether the packet was correctly received and decoded;
   an angle of arrival of one or more received signals at the multi-antenna receiving device;
   an indication of power consumption at the multi-antenna receiving device;
   a reliability target or a latency target for the multi-antenna receiving device;
   a number of consecutive successful packet transmissions to the multi-antenna receiving device;
   network loading information;
   a capacity of the first TRP; or
   an interference level at the multi-antenna receiving device.

6. The method of claim 4,
   wherein the first number of beams is one beam;
   wherein the response comprises the acknowledgment (ACK) indicating the packet was correctly received and decoded; and
   wherein the determining, based on the response, whether to alter the number of beams comprises determining to increase the number of beams to two or more beams.

7. The method of claim 6, wherein the information corresponding to one or more eigenvectors comprises information indicating a number of eigenvectors no greater than one.

8. The method of claim 4,
   wherein the first number of beams is one beam;
   wherein the determining, based on the response, whether to alter the number of beams comprises determining to maintain the number of beams as one beam; and
   wherein the information corresponding to one or more eigenvectors comprises information indicating a number of eigenvectors greater than one.

9. The method of claim 4, further comprising:
transmitting an instruction for a second TRP to either commence transmission of one or more beams to the multi-antenna receiving device, or to terminate transmission of one or more beams to the multi-antenna receiving device.

10. An apparatus for wireless communication, comprising:
a processor;
a transceiver communicatively coupled to the processor, the transceiver comprising a plurality of antennas; and
a memory communicatively coupled to the processor,
wherein the processor and the memory are configured to:
receive, via the transceiver, a packet;
calculate at least one covariance matrix corresponding to a covariance of signals, from each of the plurality of antennas, corresponding to the received packet;
calculate one or more eigenvectors of each covariance matrix of the at least one covariance matrix; and
transmit, via the transceiver, a response to the received packet, the response comprising information corresponding to the calculated one or more eigenvectors,
wherein the information corresponding to the calculated one or more eigenvectors comprises one or more of:
a number of the calculated one or more eigenvectors of the at least one covariance matrix,
information indicating whether the number of the calculated one or more eigenvectors of the at least one covariance matrix is greater than one;
information indicating whether the received packet was received over greater than one beam based on the number of the calculated one or more eigenvectors of the at least one covariance matrix; or
information indicating a beam width of a received beam, calculated based on an angular spread of the calculated one or more eigenvectors.

11. The apparatus of claim 10, wherein the processor and the memory are further configured to:
transmit, via the transceiver, a request to begin reporting the information corresponding to the calculated one or more eigenvectors.

12. The apparatus of claim 10, wherein the processor and the memory are further configured to:
receive, via the transceiver, a request to begin reporting the information corresponding to the calculated one or more eigenvectors.

13. A first transmission point (TRP) configured for wireless communication, the first TRP comprising:
a processor;
a transceiver communicatively coupled to the processor; and
a memory communicatively coupled to the processor,
wherein the processor and the memory are configured to:
transmit, via the transceiver, a packet to a multi-antenna receiving device, utilizing a first number of beams;
receive, via the transceiver, a response to the packet, the response comprising information corresponding to one or more eigenvectors of at least one covariance matrix corresponding to a covariance of signals from each of a plurality of receive antennas at the multi-antenna receiving device, used to receive the packet;
determine, based on the response, whether to alter a number of beams to a second number of beams, different from the first number of beams,
wherein the information corresponding to the one or more eigenvectors comprises one or more of:
a number of the one or more eigenvectors of the at least one covariance matrix;
information indicating whether the number of the one or more eigenvectors of the at least one covariance matrix is greater than one;
information indicating whether the multi-antenna receiving device received the packet over greater than one beam based on the number of the one or more eigenvectors of the at least one covariance matrix; or
information indicating a beam width of a received beam, the beam width based on an angular spread of the one or more eigenvectors.

14. The first TRP of claim 13, wherein the processor and memory, being configured to determine, based on the response, whether to alter the number of beams, are further configured to determine whether to alter the number of beams based further on one or more of:
the first number of beams;
a number of transmission points, including the first TRP, transmitting to the multi-antenna receiving device;
an acknowledgment or negative acknowledgment (ACK/NACK) received from the multi-antenna receiving device, indicating whether the packet was correctly received and decoded;
an angle of arrival of one or more received signals at the multi-antenna receiving device;
an indication of power consumption at the multi-antenna receiving device;
a reliability target or a latency target for the multi-antenna receiving device;
a number of consecutive successful packet transmissions to the multi-antenna receiving device;
network loading information;
a capacity of the first TRP; or
an interference level at the multi-antenna receiving device.

15. The first TRP of claim 13,
wherein the first number of beams is one beam;
wherein the response comprises the acknowledgment (ACK) indicating the packet was correctly received and decoded; and
wherein the processor and memory, being configured to determine, based on the response, whether to alter the number of beams, are further configured to determine to increase the number of beams to two or more beams.

16. The first TRP of claim 15, wherein the information corresponding to one or more eigenvectors comprises information indicating a number of eigenvectors no greater than one.

17. The first TRP of claim 13,
wherein the first number of beams is one beam;
wherein the processor and the memory, being configured to determine, based on the response, whether to alter the number of beams, are further configured to determine to maintain the number of beams as one beam; and
wherein the information corresponding to one or more eigenvectors comprises information indicating a number of eigenvectors greater than one.

18. The first TRP of claim 13, wherein the processor and the memory are further configured to:
transmit, via the transceiver, an instruction for a second TRP to either commence transmission of one or more beams to the multi-antenna receiving device, or to terminate transmission of one or more beams to the multi-antenna receiving device.

* * * * *